US009917799B2

(12) United States Patent
Chanda

(10) Patent No.: US 9,917,799 B2
(45) Date of Patent: Mar. 13, 2018

(54) TRANSACTIONAL CONTROLS FOR SUPPLYING CONTROL PLANE DATA TO MANAGED HARDWARE FORWARDING ELEMENTS

(71) Applicant: Nicira, Inc., Palo Alto, CA (US)

(72) Inventor: Anupam Chanda, San Jose, CA (US)

(73) Assignee: NICIRA, INC., Palo Alto, CA (US)

(*) Notice: Subject to any disclaimer, the term of this patent is extended or adjusted under 35 U.S.C. 154(b) by 29 days.

(21) Appl. No.: 14/970,469

(22) Filed: Dec. 15, 2015

(65) Prior Publication Data
US 2017/0171113 A1   Jun. 15, 2017

(51) Int. Cl.
*H04L 12/28* (2006.01)
*H04L 12/931* (2013.01)

(52) U.S. Cl.
CPC ................... *H04L 49/70* (2013.01)

(58) Field of Classification Search
USPC .......... 370/235–352, 392–401; 709/220–241
See application file for complete search history.

(56) References Cited

U.S. PATENT DOCUMENTS

| 5,526,484 A | 6/1996 | Casper et al. |
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 8,161,095 B2 | 4/2012 | Manion et al. |
| 8,589,919 B2 * | 11/2013 | Smith ................. G06F 9/45533 718/1 |
| 8,897,134 B2 * | 11/2014 | Kern ................... H04L 41/0816 370/235 |
| 8,964,528 B2 * | 2/2015 | Casado ................ H04L 45/745 370/218 |
| 9,014,181 B2 * | 4/2015 | Lakshman ............ H04L 45/04 370/385 |
| 9,032,095 B1 | 5/2015 | Traina et al. |
| 9,100,285 B1 * | 8/2015 | Choudhury ........... H04L 45/26 |
| 9,154,433 B2 * | 10/2015 | Koponen ........... G06F 9/45558 |
| 9,306,843 B2 | 4/2016 | Koponen et al. |
| 9,319,375 B2 | 4/2016 | Gross, IV et al. |

(Continued)

FOREIGN PATENT DOCUMENTS

EP   1154601   11/2001

*Primary Examiner* — Man Phan
(74) *Attorney, Agent, or Firm* — Adeli LLP

(57) ABSTRACT

Some embodiments provide novel methods for controllers to communicate with managed hardware forwarding elements (MHFEs) in a transactional manner. The transactional communication methods of some embodiments ensure that an MHFE receives the entirety of a control plane update that a controller supplies to it, before the MHFE starts to modify its data plane forwarding data and operations. The transactional communication methods of some embodiments provide one or more transactional boundary controls to the controllers to define complete control plane data set updates. In some embodiments, the transactional controls ensure that an MHFE receives all of a control plane update before it starts to modify its data plane forwarding data. Controllers use one transactional control in some embodiments when they define logical forwarding elements (e.g., logical switches or routers) on the MHFEs.

20 Claims, 10 Drawing Sheets

(56) References Cited

U.S. PATENT DOCUMENTS

| | | |
|---|---|---|
| 9,369,426 B2* | 6/2016 | Koponen ............... H04L 47/12 |
| 9,397,946 B1 | 7/2016 | Yadav |
| 9,455,901 B2* | 9/2016 | Davie .................... H04L 45/14 |
| 9,485,149 B1 | 11/2016 | Traina et al. |
| 9,577,927 B2* | 2/2017 | Hira ........................ H04L 45/64 |
| 9,621,461 B2 | 4/2017 | Sun |
| 9,633,040 B2 | 4/2017 | Lee |
| 9,667,541 B2 | 5/2017 | Song |
| 2002/0065919 A1* | 5/2002 | Taylor ............... G06F 17/30575 709/226 |
| 2003/0041170 A1 | 2/2003 | Suzuki |
| 2003/0163645 A1 | 8/2003 | Tremblay et al. |
| 2006/0092940 A1 | 5/2006 | Ansari et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2011/0075674 A1 | 3/2011 | Li et al. |
| 2011/0090911 A1* | 4/2011 | Hao .................... H04L 12/4633 370/395.53 |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0236761 A1 | 9/2012 | Yang et al. |
| 2012/0278802 A1 | 11/2012 | Nilakantan et al. |
| 2012/0303835 A1 | 11/2012 | Kempf et al. |
| 2013/0044636 A1 | 2/2013 | Koponen et al. |
| 2013/0058351 A1* | 3/2013 | Casado .................. H04L 47/00 370/400 |
| 2013/0121209 A1 | 5/2013 | Padmanabhan et al. |
| 2013/0132533 A1 | 5/2013 | Padmanabhan et al. |
| 2013/0287026 A1 | 10/2013 | Davie |
| 2013/0315246 A1 | 11/2013 | Zhang et al. |
| 2013/0322453 A1 | 12/2013 | Allan |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0229605 A1 | 8/2014 | Besser et al. |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0215189 A1 | 7/2015 | Lim |
| 2015/0379150 A1 | 12/2015 | Duda |
| 2016/0014073 A1 | 1/2016 | Reddy et al. |
| 2016/0173535 A1 | 6/2016 | Barabash et al. |
| 2016/0232019 A1 | 8/2016 | Shah et al. |
| 2017/0034002 A1 | 2/2017 | Sinn |
| 2017/0085502 A1 | 3/2017 | Biruduraju |
| 2017/0093617 A1 | 3/2017 | Chanda et al. |
| 2017/0093646 A1 | 3/2017 | Chanda et al. |
| 2017/0093758 A1 | 3/2017 | Chanda |

* cited by examiner

TRANSACTIONAL CONTROLS FOR SUPPLYING CONTROL PLANE DATA TO MANAGED HARDWARE FORWARDING ELEMENTS

BACKGROUND

Today, several network control systems configure software forwarding elements executing on host computers to create logical forwarding elements that span multiple host computers. Such logical forwarding elements allow multiple isolated logical networks to be created on a shared physical network infrastructure. In recent years, some network control systems have been adapted to configure hardware forwarding elements, such as top of the rack (TOR) switches. In many such cases, the TORs have configuration databases that are defined according to the hardware VTEP (VXLAN Tunnel Endpoint) schema. Network controllers of such network control systems communicate with such TOR configuration databases using the OVSdb protocol. The OVSdb protocol and hardware VTEP schema are defined by the Open vSwitch organization.

The hardware VTEP schema defines various tables to exchange control plane information between a controller and a TOR. However, neither this schema nor the OVSdb protocol require the controllers to use transactional controls in communicating with the TORs. As such, on receiving a portion of a configuration from a controller, the TOR might start modifying its data plane operation. This may cause problems as the received configuration data portion might provide a view of the logical network that is incomplete and in some cases, inconsistent with either an earlier logical network view upon which the TOR previously based its data plane operation, or with the current logical network view that the controller is trying to push to the TOR. Therefore, there is a need in the art for transactional controls for the network controllers to use to allow TORs to update their data plane operations based on complete control plane views of the logical networks.

BRIEF SUMMARY

Some embodiments provide novel methods for controllers to communicate with managed hardware forwarding elements (MHFEs) in a transactional manner. The transactional communication methods of some embodiments ensure that an MHFE receives the entirety of a control plane update that a controller supplies to it, before the MHFE starts to modify its data plane forwarding data and operations.

The network controllers in some embodiments manage the MHFEs to create one or more logical networks that span shared physical forwarding elements, including the MHFEs. In some embodiments, the shared physical forwarding elements also include software forwarding elements executing on host computers, on which multiple compute nodes (e.g., virtual machines, containers, etc.) execute. The transactional communication methods of some embodiments ensure that the MHFEs update their data plane operations based on complete control plane views of logical networks.

The transactional communication methods of some embodiments provide one or more transactional boundary controls to the controllers to define complete control plane data set updates. In some embodiments, the transactional controls ensure that an MHFE receives all of a control plane update before it starts to modify its data plane forwarding data. Controllers use one transactional control in some embodiments when they define logical forwarding elements (e.g., logical switches or routers) for the first time on the MHFEs.

In some embodiments, one configuration data tuple that is needed to create a logical forwarding element on an MHFE is a data tuple that binds (i.e., associates) the logical forwarding element with a physical port of the MHFE (e.g., a port of a hardware top-of-rack switch). This configuration data tuple is referred to below as the LAN (local area network) binding tuple. In pushing configuration data to an MHFE to define a logical forwarding element (LFE) on the MHFE, the controller in some embodiments supplies other configuration data tuples to the MHFE before the LAN binding tuple. In some of these embodiments, the controller supplies the LAN binding tuple as the last configuration data tuple to the MHFE. This is because the MHFE in some embodiments starts to create its data plane forwarding records for the LFE once the MHFE receives the LAN binding tuple.

In some embodiments, the MHFEs use the hardware-VTEP schema. In this schema, there is a Logical_Switch table where the controller creates logical switches, and a Ucast_Macs_Remote table, where the controller provides the forwarding information for those logical switches. Another table in this schema is the Physical_Port table, which includes a vlan_bindings column that binds specific VLANs on the specific physical ports of the hardware VTEP device (i.e., of an MHFE) to corresponding logical switches. To achieve transactional semantics for a logical switch, the controllers of some embodiments propagate all modifications to the Logical_Switch table and the Ucast_Macs_Remote table before updating the vlan_bindings column in the Physical_Port table for a new logical switch that the controller is defining on the MHFE.

When updating a logical network's control plane data, some embodiments (1) delete the vlan_binding tuple in the Physical_Port table to unbind the logical switch from the physical network, (2) update the configuration data in one or more MHFE's tables (e.g., forwarding information in Ucast_Macs_Remote table), and then (3) recreate the binding in the vlan_bindings column. This approach requires the logical switch to stop forwarding during the time between when the vlan_binding tuple is deleted and when it is added back. In other words, during this time, there will be a data plane outage.

Accordingly, other embodiments use other transaction controls to update the control plane configuration data of a logical switch that is already defined on an MHFE, instead of unbinding the logical switch from the MHFE. In some embodiments, an MHFE creates a lock for a logical forwarding element that is defined on it. In some of these embodiments, the controller can "steal" this lock (e.g., can take this lock even when another MHFE module is using it to access the hardware VTEP database) during a period in which the controller updates the configuration data of a logical forwarding element (LFE). While the controller has stolen the LFE's lock, no MHFE module examines its configuration data storage to detect changes to the configuration data and to update its data plane forwarding records based on such detected changes. Once the controller completes its control plane configuration update for a LFE implemented by the MHFE, the controller returns the lock for the LFE (i.e., relinquishes the lock), at which point an MHFE module can request the lock for the LFE, can detect changes to the LFE's control plane configuration, and then can update its data plane forwarding data based on these detected changes.

In the embodiments where the MHFE uses the hardware VTEP schema, this schema supports creation of a "lock" for one or more records in the hardware VTEP database. Once a lock is created for a record, a hardware VTEP database client can use the following commands to communicate with a hardware VTEP database server (for the hardware VTEP database) vis-à-vis the lock: lock request, lock steal request, and lock release. Lock request is a request to obtain the lock for a data record in order to read and/or write to the data record. When another database client has a lock for the data record, a lock request does not cause the database server to remove the lock from the other database client to provide the lock to the database client that requested the lock. A lock steal request, however, does cause the database server to remove the lock from another database client that currently has the lock in order to provide the lock to the database client that provided the lock steal request. When a database client is done with a lock, it provides a lock release command to the database server to release the lock.

Some embodiments create a lock for a logical switch record in the Logical_Switch table. Once a binding in the vlan_bindings column is established, a database client on the MHFE acquires a lock for the logical switch by providing the logical switch's identifier along with the lock request to the MHFE's hardware VTEP database server. Subsequently, when the controller wishes to change the logical switch's configuration (e.g., the logical switch's control plane data records), the controller's hardware VTEP database client provides a lock steal request and the logical switch's identifier to the database server.

The MHFE's database server provides a notification to its database client that the lock has been stolen, which indicates a forthcoming change to the forwarding information. The MHFE's database client tries to re-acquire the lock. However, its attempts fail as long as the controller is holding the stolen lock while it makes changes. The forwarding plane continues to work according to the forwarding information of the last transaction, i.e., there is no outage. After the controller is done with making its changes, it releases the lock for the logical switch. At this point, the MHFE's database client's lock re-acquisition operation succeeds. When the MHFE database client is able to re-acquire the lock, it applies all the changes that the controller made to the forwarding table to its forwarding plane. Thus, in this manner, the forwarding plane for the logical switch is transactionally updated in some embodiments.

Instead of using the lock-based approach, other embodiments define a configuration data tuple that the controller uses to explicitly inform the MHFE that the control plane configuration data is being updated and hence might not provide a consistent view of a logical forwarding element or a logical network. For instance, instead of using the lock-based approach, some embodiments change the hardware VTEP schema to add a Boolean column to the Logical_Switch table to indicate whether the logical switch's information in the hardware VTEP database is consistent from the controller's point of view. This column is referred to below as the state_consistent column.

In some embodiments, the controller initializes this column to False while creating a logical switch. The controller is free to update the vlan_binding column at any point for this logical switch. After supplying all the data tuples for the logical switch (e.g., all the data tuples to the Ucast_Macs_Remote table, Mcast_Macs_Remote table, and Physical_Port table), the controller updates the state_consistent column to True. Once that happens, the MHFE database client modifies the MHFE's forwarding tables in the data plane based on the supplied logical switch configuration tuples.

When the controller wants to modify the MHFE's control plane configuration for a logical switch, the controller first changes the state_consistent column to False. The MHFE agent monitors this column. When the column becomes False, the MHFE's forwarding records in the data plane continue to work in its last transactional state. The controller makes the changes to the MHFE's hardware VTEP database, and then changes the state_consistent column to True. At this point, the MHFE's database client applies all changes to its forwarding records in the data planes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
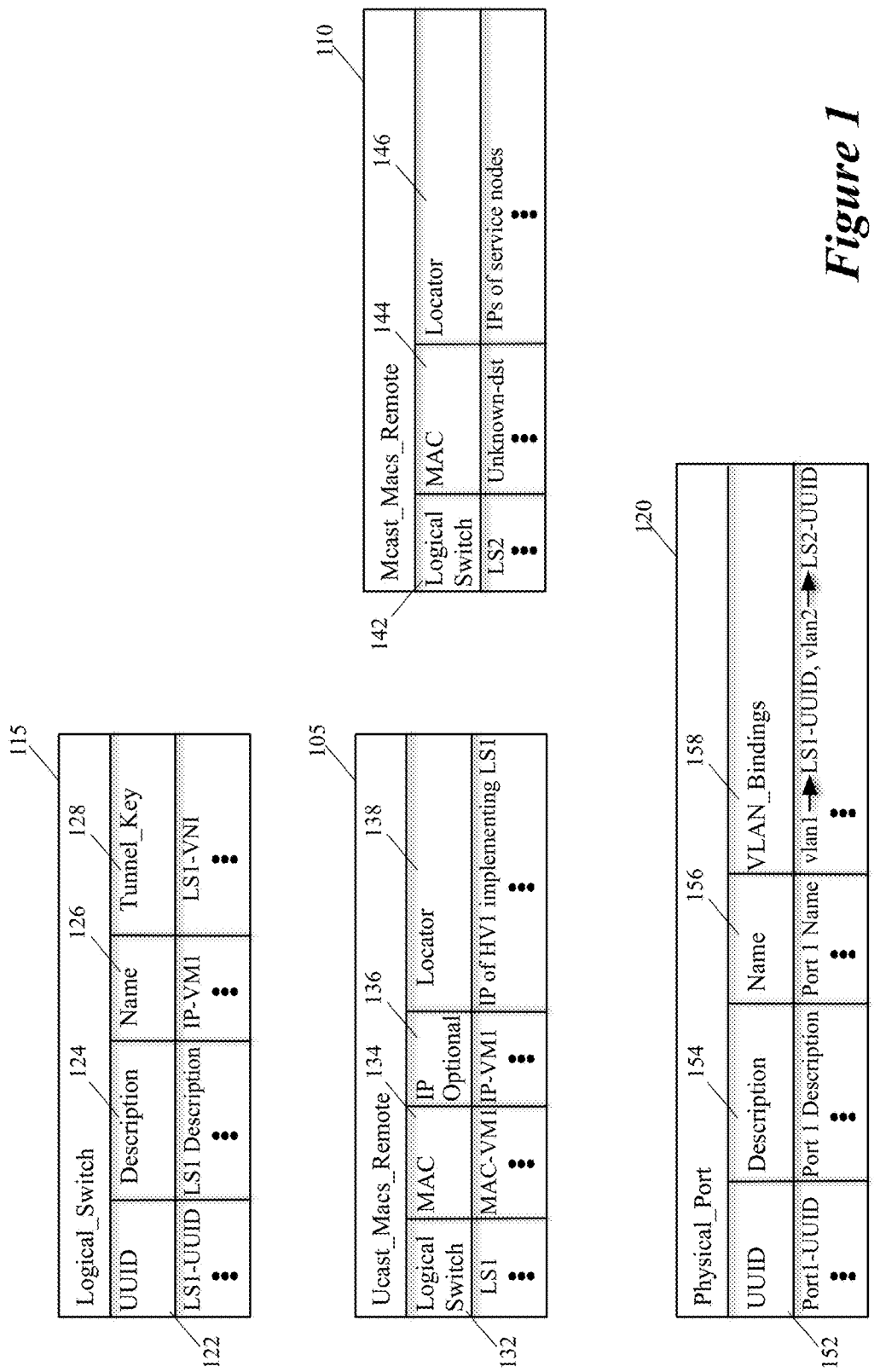
FIG. 1 illustrates four of tables that are defined in the OVSdb schema.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel methods for controllers to communicate with managed hardware forwarding elements (MHFEs) in a transactional manner. The transactional communication methods of some embodiments ensure that an MHFE receives the entirety of a control plane update that a controller supplies to it, before the MHFE starts to modify its data plane forwarding data and operations. Examples of MHFEs include top-of-rack (TOR) switches.

The network controllers in some embodiments manage the MHFEs to create one or more logical forwarding elements that span shared physical forwarding elements, including the MHFEs. In some embodiments, the shared physical forwarding elements also include software forwarding elements executing on host computers, on which multiple data compute nodes (DCNs, such as virtual machines, containers, etc.) execute. The logical forwarding elements allow multiple logical networks to be created on a shared physical compute and network infrastructure.

Each logical network's set of one or more logical forwarding elements (LFEs) can connect DCNs (e.g., virtual machines, containers, etc.) that execute on different host computers. Each LFE is an abstract construct that conceptually spans multiple forwarding elements (e.g., software forwarding elements, SFEs) to connect DCNs on multiple different hosts to each other. In some embodiments, overlay tunnel connections between the hosts facilitate the creation of the LFEs. Each logical network can isolate the traffic exchanged between its DCNs from the traffic from DCNs of other logical networks. Many examples of logical networks and logical forwarding elements are described in U.S. Published Patent Application 2013/0058335, U.S. Pat. No. 8,958,298, U.S. Published Patent Application 2015/0063360, and U.S. Published Patent Application 2015/0263946.

As used in this document, data messages or packets generically refer to a collection of bits in a particular format sent across a network. One of ordinary skill in the art will recognize that the term data message or packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

The transactional communication methods of some embodiments ensure that the MHFEs update their data plane operations based on complete control plane views of logical networks. The transactional communication methods of some embodiments provide one or more transactional boundary controls to the controllers to define complete control plane data set updates. In some embodiments, the transactional controls ensure that an MHFE receives all of a control plane update before it starts to modify its data plane forwarding data.

Controllers use one transactional control in some embodiments when they define logical forwarding elements (e.g., logical switches or routers) for the first time on the MHFEs. In some embodiments, one configuration data tuple that is needed to create a logical forwarding element on an MHFE is a data tuple that binds (i.e., associates) the logical forwarding element with a physical port of the MHFE (e.g., a port of a TOR switch). This configuration data tuple is referred to below as the LAN (local area network) binding tuple. In pushing configuration data to an MHFE to define a logical forwarding element (LFE) on the MHFE, the controller in some embodiments supplies other configuration data tuples to the MHFE before the LAN binding tuple. In some of these embodiments, the controller supplies the LAN binding tuple as the last configuration data tuple to the MHFE. This is because the MHFE in some embodiments starts to create its data plane forwarding records for the LFE once the MHFE receives the LAN binding tuple.

The MHFEs in some embodiments contain configuration databases and execute database servers with which the network controllers can interact through a database protocol. For instance, in some embodiments, the WIFE configuration database is a hardware VTEP database and the communication protocol is an OVSdb (an Open Virtual Switch (OVS) database) protocol. In some embodiments, the hardware VTEP schema for the MHFE specifies multiple MHFE database tables to which a controller can write. In the hardware VTEP schema, the LAN binding tuple is defined in one column of the Physical_Port table of this schema.

FIG. 1 illustrates this table along with three other tables in the hardware VTEP schema. The illustrated tables are the Ucast_Macs_Remote table 105, Mcast_Macs_Remote table 110, the Logical_Switch table 115, and the Physical_Port table 120. In an MHFE's database, the Logical_Switch table 115 contains a record for each logical switch implemented by the MHFE. For each logical switch that the MHFE implements, a controller in some embodiments creates a record in the Logical_Switch table 115. As shown, each logical switch's record includes (1) a UUID (universally unique identifier) 122 tuple that provides a universal unique identifier for the logical switch, (2) a description 124 that provides a textual description of the logical switch, (3) a name tuple 126 that provides the name of the logical switch, and (4) a tunnel_key 128 that provides the VNI (VXLAN network identifier) of the logical switch.

The Ucast_Macs_Remote table 105 provides the forwarding information for the logical switches. The Ucast table provides the unicast MAC (media access control) addresses for the DCNs (VMs, containers, etc.) associated with each logical switch. Optionally, this table also provides the IP (Internet Protocol) address of each of these VMs. This table also provides the VTEP IPs for each logical switch.

As shown, each record in the Ucast_Macs_Remote table 105 includes (1) a logical switch field 132 that specifies the logical switch with which a port of an end machine is associated (in the case that the table is instantiated on an L3 MHFE, this field also specifies the logical router ports associated with the logical switch), (2) a MAC address field 134 that specifies the corresponding MAC address of the port (the MAC address of the end machine's port associated with the logical switch's port), (3) an optional field 136 that can include an IP address associated with the MAC address, and (4) a locator field 138 that specifies the IP address of the VTEP for the corresponding MAC address.

Because of the locator field 138, the Ucast table 105 is referred to as a tunnel endpoint locator table or a tunnel endpoint table. For an L2 MHFE, the controllers in some embodiments supply the Ucast table with the physical locator addresses (i.e., IP addresses) of the MFEs (hardware and software) that implement (1) the different logical switches' ports that are associated with the end machines of the logical network, and (2) the logical router ports that receive the L3 packets from the MHFE. The Ucast table 105 specifies the next destination of a unicast packet with a unique destination MAC address. By locating the endpoints, the L2 MHFE is able to establish tunnels between the MHFE and other MFEs and exchange the network data through the established tunnels.

The Mcast_Macs_Remote table 110 is another tunnel endpoint locator table. The Mcast table 110 specifies the next destination of a broadcast, multicast, or unknown unicast packet that does not have a unique destination MAC address. As shown, the table 110 has three different fields 142, 144, and 146 that are similar to the fields 132, 134, and 138 of Ucast table 105, with the exception that Mcast table 110 is for the destination MAC addresses that are not known to the MHFE or the destination MAC addresses of multicast and broadcast packets in some embodiments. The controllers in some embodiments configure the locator column 146 of the Mcast tables 110 with IP addresses of service nodes that process BUM (broadcast, unknown, and multicast) packets. This way, the MHFEs forward any BUM packet to service nodes for processing.

The Physical_Port table 120 is a table that is specified by the MHFEs and read by the controllers, except that the controller updates the VLAN_bindings column 158 to bridge VLANs (virtual LANs) on specific physical ports of the MHFE to logical switches. As shown, this table 120 includes three columns 152, 154 and 156 that define the port UUID, the port description, and the port name. The vlan_bindings column 158 is a map of a VLAN to a logical switch UUID. This column 158 establishes the logical switch to physical port association (for given VLANs).

Updating the VLAN binding column is the transaction that causes a logical switch to bridge to the physical network. Some embodiments control this update in order to provide a transactional boundary in the pushed transaction data. Specifically, to achieve transactional semantics for a logical switch, the controllers of some embodiments propagate all configuration data to the MHFE (e.g., all the data to the Logical_Switch table 115, the Ucast_Macs_Remote table 105, and the Mcast_Macs_Remote table 110) before updating the vlan_bindings column 158 in the Physical_Port table 120.

When updating a logical network's control plane data, some embodiments (1) delete the vlan_binding tuple in the Physical_Port table 120 to unbind the logical switch from the physical network, (2) update the configuration data in one or more MHFE's tables (e.g., forwarding information in Ucast_Macs_Remote table 105), and then (3) recreate the binding in the vlan_bindings column. This approach requires the logical switch to stop forwarding during the time between when the vlan_binding tuple is deleted and when it is added back. In other words, during this time, there will be a data plane outage.

Accordingly, other embodiments use other transaction controls to update the control plane configuration data of a logical switch that is already defined on an MHFE, instead of unbinding the logical switch from the MHFE. In some embodiments, an MHFE creates a lock for a logical forwarding element that is defined on it. In some of these embodiments, the controller can "steal" this lock (e.g., can take this lock even when another MHFE module is using it to access the hardware VTEP database) during a period in which the controller updates the configuration data of a logical forwarding element (LFE). While the controller has stolen the LFE's lock, no MHFE module examines its configuration data storage to detect changes to the configuration data and to update its data plane forwarding records based on such detected changes. Once the controller completes its control plane configuration update for a LFE implemented by the MHFE, the controller returns the lock for the LFE (i.e., relinquishes the lock), at which point an MHFE module can request the lock for the LFE, can detect changes to the LFE's control plane configuration, and then can update its data plane forwarding data based on these detected changes.

In the embodiments where the MHFE uses the hardware VTEP schema, this schema supports creation of a "lock" for one or more records in the hardware VTEP database. Once a binding in the vlan_bindings column is established, a database server executing on the MHFE creates a lock for the logical switch in some embodiments. The database server creates this lock at the direction of a database client on the controller in some embodiments. In some embodiments, this lock has an identifier that identifies the logical switch.

Once a lock is created for a record, a hardware VTEP database client can use the following commands to communicate with a hardware VTEP database server (for the hardware VTEP database) vis-à-vis the lock: lock request, lock steal request, and lock release. Lock request is a request to obtain the lock for a data record in order to read and/or write to the data record. When another database client has a lock for the data record, a lock request does not cause the database server to remove the lock from the other database client to provide the lock to the database client that requested the lock. A lock steal request, however, does cause the database server to remove the lock from another database client that currently has the lock in order to provide the lock to the database client that provided the lock steal request. When a database client is done with a lock, it provides a lock release command to the database server to release the lock.

Some embodiments create a lock for a logical switch record in the Logical_Switch table. Once the binding in the vlan_bindings column is established and the lock is created, a database client on the MHFE acquires a lock for the logical switch by providing the logical switch's identifier along with the lock request to the MHFE's hardware VTEP database server. Subsequently, when the controller wishes to change the logical switch's configuration (e.g., the logical switch's control plane data records), the controller's hardware VTEP database client provides a lock steal request and the logical switch's identifier to the database server.

The MHFE's database server provides a notification to its database client that the lock has been stolen, which indicates a forthcoming change to the forwarding information. The MHFE's database client tries to re-acquire the lock. However, its attempts fail as long as the controller is holding the stolen lock while it makes changes. The forwarding plane continues to work according to the forwarding information of the last transaction, i.e., there is no outage. After the controller is done with making its changes, it releases the lock for the logical switch. At this point, the MHFE's database client's lock re-acquisition operation succeeds. When the MHFE database client is able to re-acquire the lock, it applies all the changes that the controller made to the forwarding table to its forwarding plane. Thus, in this manner, the forwarding plane for the logical switch is transactionally updated in some embodiments.

Figure 2:
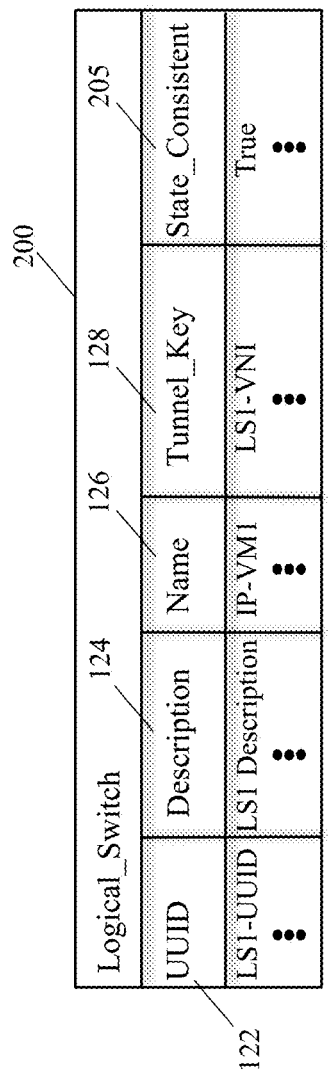
FIG. 2 illustrates a modified Logical Switch table with a state_consistent column.

Instead of using the lock-based approach, other embodiments define a configuration data tuple that the controller uses to explicitly inform the MHFE that the control plane configuration data is being updated and hence might not provide a consistent view of a logical forwarding element or a logical network. For instance, instead of using the lock-based approach, some embodiments change the hardware VTEP schema to add a Boolean column to the Logical_Switch table to indicate whether the logical switch's information in the hardware VTEP database is consistent from the controller's point of view. This column is referred to below as the state_consistent column. FIG. 2 illustrates such a modified Logical_Switch table 200 with a state_consistent column 205.

In some embodiments, the controller initializes this column to False while creating a logical switch. The controller is free to update the vlan_bindings column of the Physical_Port table at any point for this logical switch. After supplying all the data tuples for the logical switch (e.g., all the data tuples to the Ucast_Macs_Remote table, Mcast_Macs_Remote table, and Physical_Port table), the controller updates the state_consistent column to True. Once that happens, the MHFE database client modifies the MHFE's forwarding tables in the data plane based on the supplied logical switch configuration tuples.

When the controller wants to modify the MHFE's control plane configuration for an existing logical switch, the controller first changes the state_consistent column 205 to False. The MHFE agent monitors this column. When the column becomes False, the MHFE's forwarding records in the data plane continue to work in its last transactional state. The controller makes the changes to the MHFE's hardware VTEP database, and then changes the state_consistent column to True. At this point, the MHFE's database client applies all changes to its forwarding records in the data planes.

The above-described transactional control techniques will be further described below by reference to FIGS. 5-9. However, before describing these figures, the network control system of some embodiments will be further described below by reference to FIGS. 3 and 4.

Figure 3:
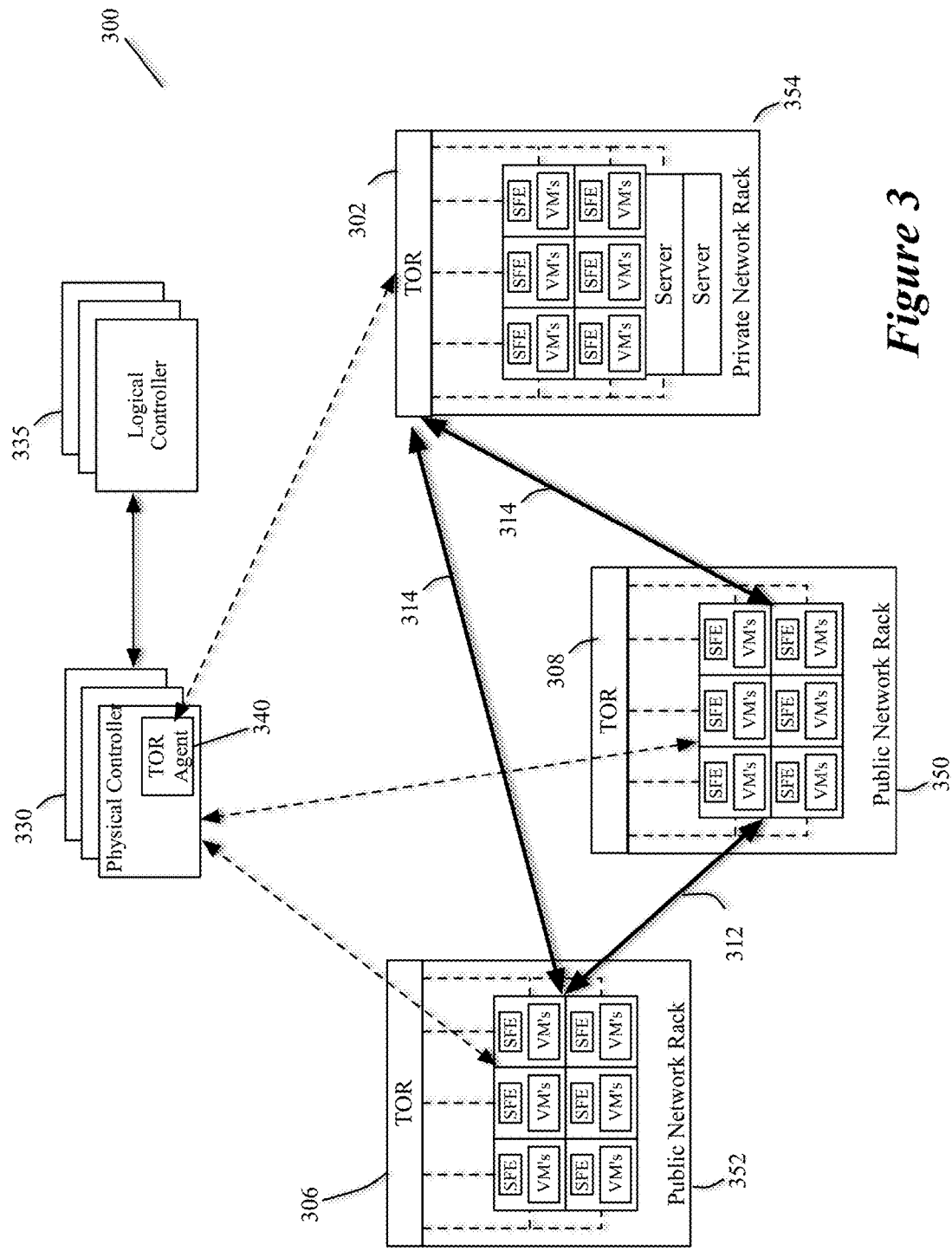
FIG. 3 conceptually illustrates a network control system that implements the MHFE management methods of some embodiments of the invention.

FIG. 3 illustrates a network control system 300 that implements the MHFE management methods of some embodiments of the invention. In this system, the MHFE is a TOR switch 302 that communicatively couples data compute nodes (e.g., VMs, containers, etc.) that execute on host computers in a shared public network, with standalone or virtualized servers in a private network. In this example, the public network includes two racks 350 and 352 that include a plurality of VMs that execute on shared host computers. The two racks have two TORs 306 and 308. The private network includes a rack 354 that includes virtualized and non-virtualized servers. One of ordinary skill will realize that in other examples the data compute nodes in the private network do not reside in a rack or in a single rack. Also, in some embodiments, the private and public network compute nodes can reside in the same datacenter (i.e., same physical location), or they can reside in different datacenters (i.e., in different locations).

The TOR 302 implements a logical switch to connect the servers in the private network (i.e., in the rack 354) to the VMs in the public network. As shown, the servers of the public racks 350 and 352 execute SFEs (e.g., a software switch and/or router) in addition to the VMs. These SFEs are configured by a cluster of physical controllers 330 and a cluster of logical controllers 335 to form multiple logical networks, each with one or more logical switches and routers. The logical networks isolate the data message communication of the different sets of VMs from each other, in order to allow the different sets of VMs for different logical networks to operate securely on the same and/or different hosts.

In some embodiments, the host computers in the same public network rack or in two different public network racks can connect to one another through one or more tunnels 312 that allow the LFEs of the logical networks to be formed as logical overlay forwarding elements. The tunnel headers in some embodiments include logical network identifiers (e.g., VNIs) that are needed to uniquely identify the LFEs. Different types of tunnels can be used in different embodiments. Examples of such tunnels include STT (stateless transport tunnels), GRE (Generic Routing Encapsualtion) tunnels, VXLAN tunnels, Geneve tunnels, etc. Tunnels can often be viewed as point-to-point logical wire connections between their endpoints (e.g., between a host and a TOR, or between two hosts) because packets inside the tunnel headers are transparent to the intervening network fabric (e.g., intervening switches, routers, etc.).

In this environment, the network controllers 330 and 335 configure the TOR 302 to become part of a logical network formed by SFEs in the public network rack(s). These controllers, on the other hand, do not configure the TORs 306 and 308 to be part of the logical networks. These TORs 306 and 308 are treated as intervening network fabric. As shown, the TOR 302 connects to the host computers in the public network racks 350 and 352 through multiple logical overlay tunnels 314 for carrying the logical network identifiers for the logical network and for isolating the logical network data messages from intervening public network fabric (e.g., from TORs 306 and 308 on the racks 350 and 352). By incorporating this TOR 302 into a logical network (e.g., into a logical switch for a logical network), the data messages from the VMs of the logical network can be directed to the ports of the TOR 302 for forwarding to DCNs (e.g., VMs and servers) in the private network rack 354.

The logical controllers generate data to define the logical forwarding elements, while the physical controllers distribute the generated data to the TOR 302 and SFEs. The number of logical controllers can be different than the number of logical networks as one logical controller can generate data for multiple logical networks. The generated data is used to configure the SFEs and TOR 302 to implement the logical forwarding elements. In some embodiments, the generated data is transformed into physical data by the physical controllers 330, local controllers (not shown) executing on the hosts, and/or by a module operating on the TOR 302, before this data is supplied to the forwarding plane of the SFEs and/or TOR 302. For instance, before distributing the data generated by the logical controller, a physical controller in some embodiments converts the data into another format, e.g., into (1) physical control plane data for the TOR 302 and/or SFEs, or (2) into a format that a TOR module or host local controller can further process to produce physical control plane data.

The number of physical controllers can be different than the number of managed TORs or SFEs as one physical controller typically distributes data to multiple managed TORs or SFEs. Also, in some embodiments, only one physical controller is the master controller for supplying data to a set of managed forwarding elements (e.g., SFEs or MHFEs) to configure the managed forwarding elements to facilitate the creation of LFEs. At any given time, only the master physical controller can provide data to its managed forwarding elements. In some embodiments, each forwarding element's master physical controller can have another physical controller that operates as a slave physical controller that serves as a backup (e.g., a hot standby backup) to the master physical controller in case the master controller fails.

In some embodiments, one controller can operate as both a logical controller and a physical controller. Each controller in some embodiments is a separate software process, and one computing device can execute two controller processes, where one controller process is a logical controller and another controller process is a physical controller. To communicate with the managed TORs, each physical controller has a TOR agent 340 to communicate with the TORs for which the physical controller is the master controller (i.e., the primary controller for communicating with the TORs). In some embodiments, the managed TORs and TOR agents communicate with each other by using the OVSdb protocol. In some embodiments, the TOR agents employ the transactional boundary controls of some embodiments to ensure that they provide configuration data in a transactional manner to create LFEs or to update LFEs. In some embodiments, the controllers (e.g., the logical and physical controllers 330 and 335) communicate through RPC (remote procedure call) channels.

In some embodiments, the network controller cluster defines each logical network by configuring the software and hardware forwarding elements (e.g., TOR switches). To configure such switches, some embodiments implement database servers on software and hardware forwarding elements. The network controller cluster then communicates with the database servers to provide data for configuring these software and hardware forwarding elements to implement logical forwarding elements.

Figure 4:
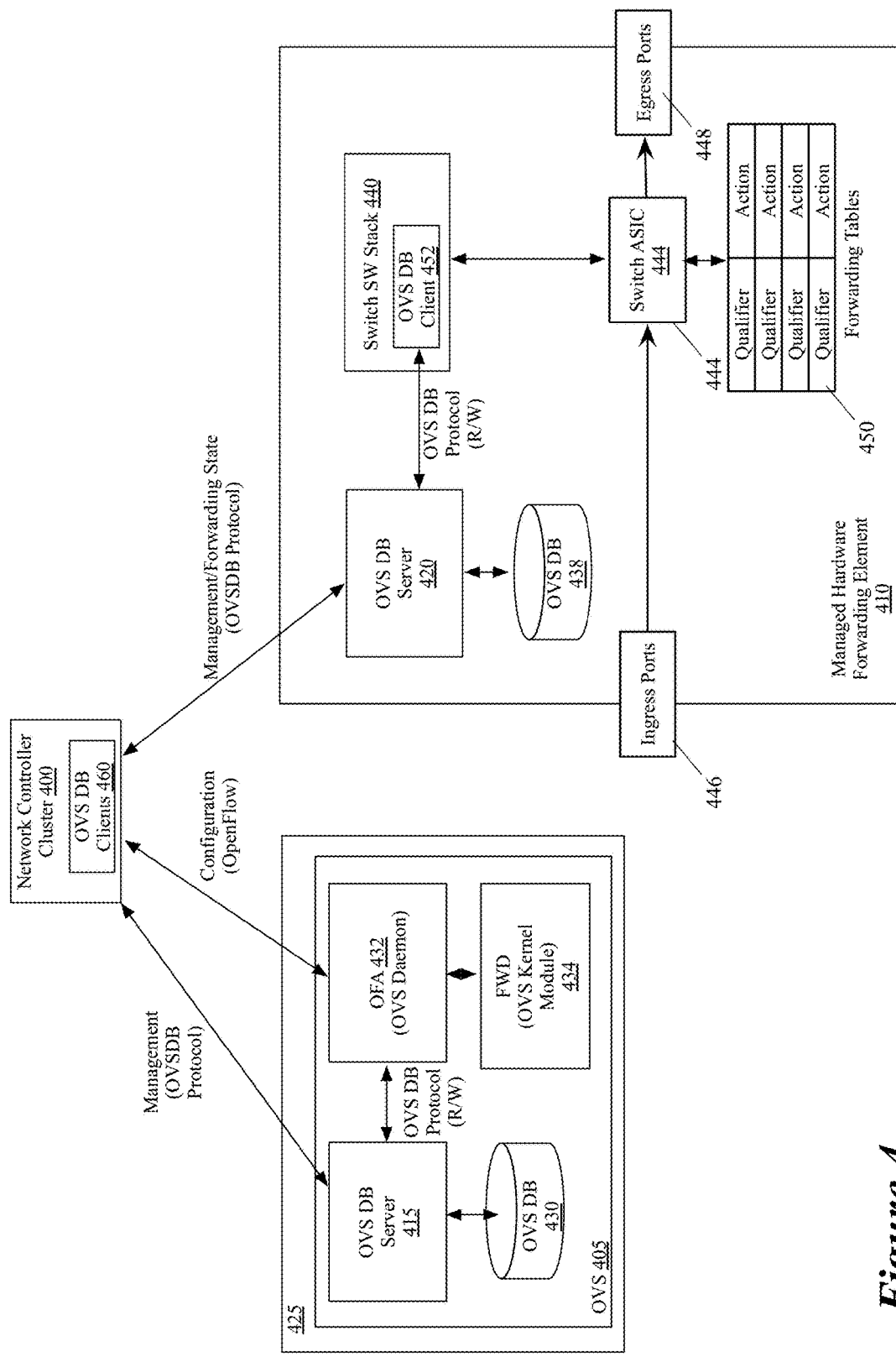
FIG. 4 conceptually illustrates how a network controller communicates with a software switch and a hardware switch in some embodiments.

FIG. 4 illustrates how a network controller cluster 400 communicates with a managed software switch 405 and a managed hardware switch 410 (e.g., a TOR) in some embodiments. In this example, each of the switches has an OVSdb server 415 and 420 with which the network controller cluster 400 communicates by using the OVSdb protocol. The software switch 405 is an OVS (Open Virtual Switch) switch that executes on a host computer 425. As shown, the software switch 405 has a database server 415, an OVS database 430, an OpenFlow agent 432, and a forwarding module 434. In the discussion below, the flow agent 432 may be referred to as an OVS daemon, and the forwarding module 434 may be referred to as a kernel module. As further shown, the hardware switch 410 includes a database server 420, an OVS database 438, a software stack 440, a switch ASIC 444, ingress and egress ports 446 and 448, and forwarding tables 450. The software stack 440 has a database client 452.

The network controller cluster 400 also has OVSdb clients 460 to interact with the OVSdb servers 415 and 420. In some embodiments, the network controller cluster 400 includes logical controllers 335 and physical controllers 330 with a TOR agent 340. In these embodiments, the physical controller 330 has an OVSdb client to interact with the OVSdb server 415 on the software switch 405, and this controller's TOR agent has another OVSdb client to interact with the OVSdb server 420 on the hardware switch 410.

As shown, the network controller cluster 400 exchanges management data with the OVSdb server 415 of the software switch 405 by using OVSdb protocol, while exchanging configuration data with the OVS daemon 432 of the software switch by using the OpenFlow protocol. The network controller cluster 400 exchanges management data and forwarding state with the hardware switch 410 by using the OVSdb protocol.

In some embodiments, the host 425 includes hardware, a hypervisor, and one or more virtual machines (VMs). The hardware may include typical computer hardware, such as processing units, volatile memory (e.g., random access memory (RAM)), nonvolatile memory (e.g., hard disc drives, optical discs, etc.), network adapters, video adapters, or any other type of computer hardware. The hardware can also include one or more NICs (network interface controllers).

A hypervisor is a software abstraction layer that can run on top of the hardware of the host 425. There are different types of hypervisors, namely Type 1 (bare metal), which runs directly on the hardware of the host, and Type 2 (hosted), which run on top of the host's operating system. The hypervisor handles various management tasks, such as memory management, processor scheduling, or any other operations for controlling the execution of the VMs. Moreover, the hypervisor communicates with the VMs to achieve various operations (e.g., setting priorities). In some embodiments, the hypervisor is a Xen hypervisor while, in other embodiments, the hypervisor may be any other type of hypervisor for providing hardware virtualization of the hardware on the host 425.

In some embodiments, the software switch 405 runs on a VM. The VM can be a unique virtual machine, which includes a modified Linux kernel (e.g., to include the OVS kernel module 434). The VM of such embodiments is responsible for managing and controlling other VMs running on the hypervisor. In some embodiments, the VM includes a user space and the OVS daemon runs as a background process in the user space.

The OVS daemon 432 is a component of the software switch 405 that makes switching decisions. On the other hand, the kernel module 434 receives the switching decisions, caches them, and uses them subsequently to process packets. For instance, when a packet comes in, the kernel module 434 first checks a datapath cache to find a matching flow entry. If no matching entry is found, the control is shifted to the OVS daemon 432. The OVS daemon 432 examines one or more flow tables to generate a flow to push down to the kernel module 434. In this manner, when any subsequent packet is received, the kernel module 434 can quickly process the packet using the cached flow entry. The kernel module 434 provides a fast path to process each packet.

Network controller 400 uses the OpenFlow protocol to inspect and modify a set of one or more flow tables managed by the OVS daemon 432. The network controller cluster 400 computes flows and pushes them to the software switch 405 through this OpenFlow channel. The network controller communicates with the database server 415 of the software switch 405 by using the database protocol. Through these communications, the network controller can push configuration data for creating and managing overlay tunnels to transport nodes. The network controller might also use OVSdb protocol for discovery purposes (e.g., discover which virtual machines are hosted at the hypervisor). The OVS daemon 432 also communicates with the database server 415 to access management data (e.g., bridge information, virtual interfaces information) stored in the database 430.

Unlike its communication with the software switch 405, the network controller 400 communicates with the hardware switch 410 by just using the OVSdb protocol. The database protocol is essentially used to control the hardware switch 410. Through the database channel, the network controller reads the configurations from the hardware switch (e.g., an inventory of its physical ports) and sends management data to the hardware switch. For example, the network controller 400 can send instructions to the hardware switch to create tunnel ports for a logical switch. Also, when the network controller exchanges forwarding state (e.g., L2 and/or L3 forwarding state) with the hardware switch 410, the network controller can instruct the hardware switch 410 to program its forwarding table using the database protocol.

The hardware switch's ingress ports 446 are a set of ports through which the hardware switch 410 receives network data. The ingress ports 446 may include different numbers of ingress ports in different embodiments. As shown, the ingress ports 446 receives network data that is external to the switch 410. Packets received through the ingress ports are processed by the switch's ASIC 444.

The switch ASIC is a component, which is specifically designed to support in-hardware forwarding. That is, it is primarily designed to quickly forward packets. To simplify the description, only one switching ASIC is shown. However, one of ordinary skill in the art would understand that the hardware switch 410 could include a number of ASICs that operate in conjunctions with one another to forward packets.

The ASIC 444 processes the packets that it receives by using the flow entries in its forwarding tables 450. In some embodiments, the forwarding tables 450 store active flow tables and/or flow entries that are used to determine operations for making switching decisions. In this example, each flow entry includes a qualifier and an action. The qualifier defines a set of fields to match against a set of packet header fields. As shown, the flow entries are stored in memory. The memory can be random access memory (RAM) or some other type of memory such as Content Addressable Memory (CAM) or Ternary Content Addressable Memory (TCAM). For example, a vendor may design their Layer 2 switches with CAM for performing Layer 2 switching and/or with TCAM for performing Quality of Service (QoS) functions. The switch architecture may support the ability to perform multiple lookups into multiple distinct CAM and/or TCAM regions in parallel. The CAM and TCAM are examples of switching ASICs that some vendors' switches leverage for line-speed fast switching.

After processing the packet, the ASIC 444 supplies the packet to one of the egress ports 448. The egress ports 448 represent a set of ports through which the switching element 410 sends network data. The egress ports 448 may include different numbers of egress ports in different embodiments. In some embodiments, some or all of the egress ports 448 may overlap with some or all of the ingress ports 446. The ports 446 and 448 along with the ASIC 444 and forwarding tables 450 compose the data plane datapath of the hardware switch 410. The flow entries in the forwarding tables 450 represent the data plane records of the hardware switch 410, while the database records in the OVS database 438 represent the control plane records of the hardware switch 410.

The OVSdb server 420 controls access to the database 438. Through this server 420, the database client 452 accesses the database 438 to read and write data. In addition, through the OVSdb server 420, the OVSdb client 460 on the network controller 400 accesses the database 438 to read and write data (e.g., management data and forwarding state). In some embodiments, the database server 420 may send a notification to one database client (e.g., on the switch end) if the other database client (e.g., on the network controlled end) updates a table or a subset of a table of the database 438. In some embodiments, the database protocol specifies a monitor call, which is a request, sent from a database client (452 or 460) to the database server 420, to monitor one or more columns of a table and receive updates when there is an update to the one or more columns (e.g., a new row value, an update to an existing row value, etc.).

For example, when the client 460 on the network controller 400 makes an update to database 438 through the OVSdb server 420, the OVSdb server 420 in turn generates a notification for the hardware switch's client 452. The client 452 may then read the update, and have its associated software stack 440 program the forwarding tables 450 of the switch ASIC 444. Another example is when the database client 452 on the switch's software stack 440 updates the database 438 (through the server 420) with MAC addresses of a machine that is connected to its port. This would in turn cause the database server 420 to send a notification regarding the update to the client 460 on the network controller 400.

In some embodiments, the database server 420 does not notify the OVSdb client 452 of the creation of a logical forwarding element data set until the vlan_binding column for the logical forwarding element has been defined. Alternatively, in embodiments that define a state_consistent tuple for the logical forwarding element, the database server 420 does not notify the OVSdb client 452 of updates to the records for a logical forwarding element after the state_consistent tuple is changed from True to False, until this tuple is changed back to True.

In some embodiments, the database server 420 is designed to handle transactions and deal with conflicts with multiple writers (e.g., when more than one OVSdb client tries to write to the OVS database 438). The database server 420 is also designed to provide asynchronous notifications. For example, when there is an update to a database table, the database server 420 sends a notification regarding an update to a client (e.g., executing on a network controller or on the hardware switch). In some embodiments, the database server 420 defines a lock for each logical forwarding element, and processes lock requests, lock steal requests and lock releases from the network controller's OVSdb client 460 and hardware OVSdb client 452.

The switch software stack 440 represents several programs that operate on the hardware switch 410. The software stack 440 can include a variety of different programs to configure and manage the switch 410. This can include management that is in and outside of the scope of the network controller cluster. For instance, the software stack 440 may include a program to update its firmware, modify switch settings (e.g., its administrative password), and/or reset the switch. The software stack 440 is vendor specific, which means that it can change from one hardware-switch vendor to another hardware-switch vendor. Accordingly, different vendors might provide different features that are represented by their corresponding software stack 440.

The software stack 440 includes at least one module to program the switch ASIC 444 and update the forwarding plane records based on control plane records retrieved from the OVS database 438. The software stack 440 updates the data plane records (e.g., forwarding records in the forwarding table 450) using any number of known techniques. Different switch vendors use different techniques to update data plane records based on the retrieved control plane records.

Figure 5:
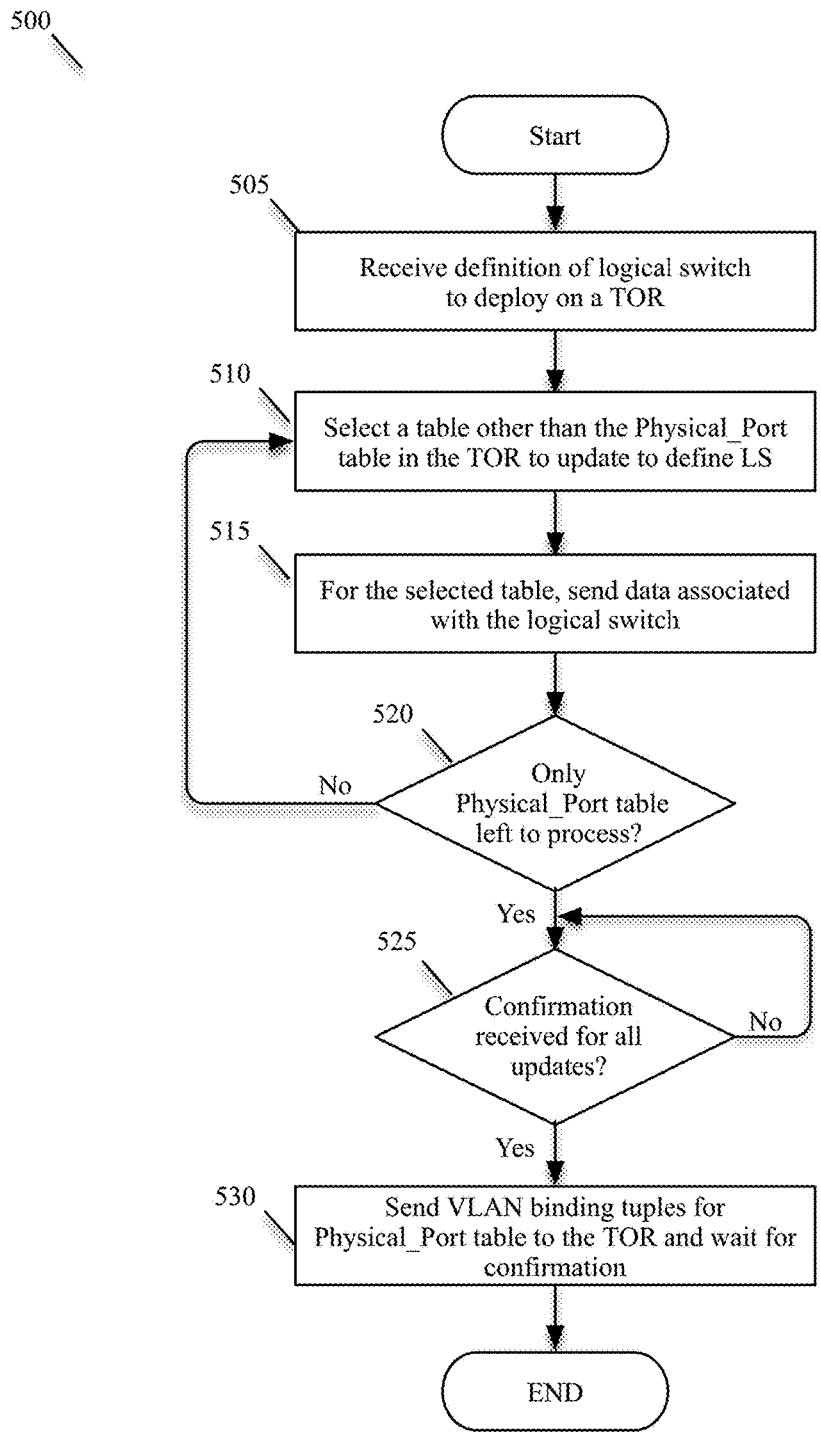
FIG. 5 conceptually illustrates a process that a physical controller performs in some embodiments to supply the definition of a logical forwarding element to an MHFE in a transactional manner.

FIG. 5 illustrates a process 500 that a physical controller performs in some embodiments to supply the definition of a logical forwarding element to an MHFE in a transactional manner. In this example, the TOR agent of the physical controller performs this process to deploy a logical switch on a TOR in a transactional manner. Many of the embodiments described below by reference to FIGS. 6-9 are also described by reference to operations of TORs and the creation of logical switches. However, one of ordinary skill will realize that other embodiments perform analogous processes to define other types of logical forwarding elements and/or to deploy logical forwarding elements on different types of MHFEs.

As shown, the process 500 initially receives (at 505) the definition of a logical switch that needs to be deployed on a TOR. Next, the process 500 selects (at 510) a table to update in the TOR's OVS database 438 other than the Physical_Port table. Examples of such tables include the Ucast_Macs_Remote table, the Mcast_Macs_Remote table and the Logical_Switch table. At 515, the process 500 sends to the TOR's OVSdb server 420 one or more packets that contain data for defining one or more records in the selected table (i.e., the table selected at 510) for the logical switch. Examples of such records include the logical switch record in the Logical_Switch table 115, MAC records in the Ucast table 105, and service node records in the Mcast table 110, as described above by reference to FIG. 1.

Next, at 520, the process 500 determines whether it has pushed the data for all the OVS database tables except the Physical_Port table to the TOR's OVSdb server 420. If not, the process 500 returns to 510 to select another OVSdb table other than the Physical_Port table, and then to 515 to push data records for this newly selected table to the TOR's OVSdb server 420. For some embodiments, the illustration of the determination operation 520 is conceptual as in these embodiments the TOR agent selects the OVSdb tables according to a fixed order, in which the Physical_Port table is last.

Once the process 500 determines (at 520) that it has processed all the OVSdb tables except for the Physical_Port table, the process determines (at 525) whether it has received confirmation from the OVSdb server 420 that it has created and/or populated the appropriate records in the OVS database 438 with the data that the process 500 send at 515. If not, the process 500 remains at 525 until it has received the required confirmations. In some cases, the process 500 resends data for an OVSdb table when it does not receive the required confirmation for this table.

Once the process 500 determines (at 525) that it has received confirmations for all the OVSdb tables for which it has pushed data to the TOR, the process transitions to 530. In other embodiments, the process 500 does not check (at 525) to see whether it has received confirmations from the OVSdb server 420 that is has created and/or populated the appropriate records in the OVS database 438 based on the data provided by the process 500. Instead, in these embodiments, the process 500 transitions to 530 when it determines (at 520) that it has the data for the Physical_Port table to process.

At 530, the process 500 sends the VLAN binding tuple or tuples for the Physical_Port table to the OVSdb server 420. The process 500 remains at 530 until it receives confirmation from the OVSdb server 420 that it has processed the VLAN binding tuples. Once the process 500 receives this confirmation, it ends. Again, the process 500 in some embodiments does not wait for confirmation from the OVSdb server 420, and just ends after it sends the VLAN binding tuple or tuples for the Physical_Port table.

The process 500 pushes (at 530) the VLAN binding tuples last in order to prevent the hardware switch's OVSdb client 452 from updating the forwarding tables 450 until all of the logical switch's records have been specified in the OVS database 438. In some embodiments, the OVSdb server 420 does not notify the OVSdb client 452 of changes to the OVS database 438 relating to a logical switch until the VLAN binding column is populated. Hence, by delaying pushing the VLAN binding tuples, the process 500 can prevent the OVSdb client 452 from updating the forwarding plane until the process has pushed all the control plane records for the logical switch to the hardware switch.

Figure 6:
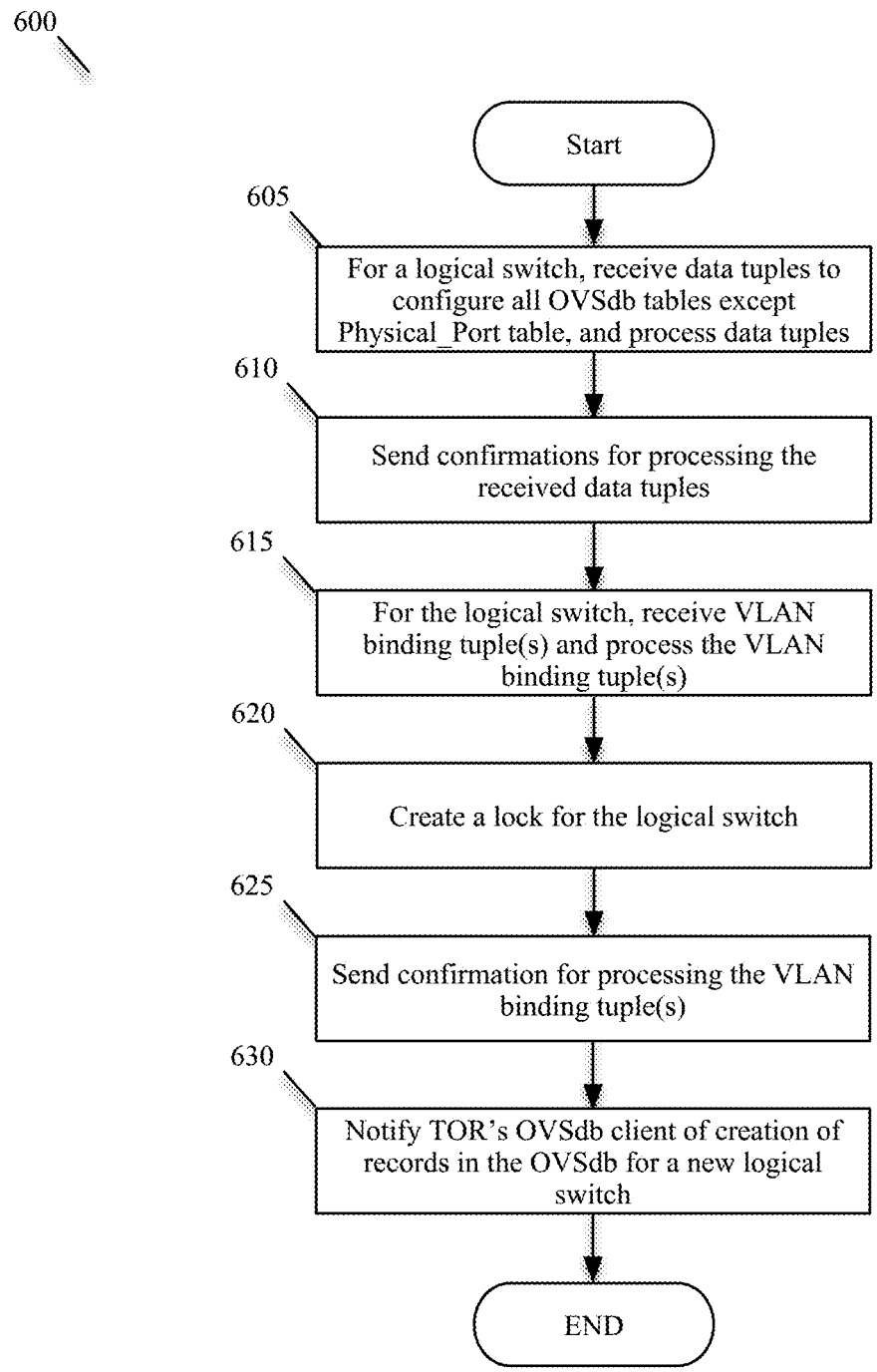
FIG. 6 conceptually illustrates a process that a TOR's OVSdb server performs to define a logical switch on the TOR.

FIG. 6 illustrates a process 600 that a hardware switch's OVSdb server 420 performs to define a logical switch on the hardware switch. As shown, this process starts when the OVSdb server 420 receives (at 605) data tuples from the process 500 of the network controller (e.g., TOR agent) for the logical switch. These data tuples include tuples for the OVSdb tables that need to have records for the logical switch to be defined on the hardware switch. These tables include the Ucast_Macs_Remote table 105, the Mcast_Macs_Remote table 105 and the Logical_Switch table 115. The received data tuples (at 605) do not include data tuples for the Physical_Port table 120.

At 605, the process 600 creates the records and/or populates previously created records in these tables based on the received data tuples. At 610, the process 600 then sends confirmation to the process 500 of the network controller of its processing of the received data tuples (i.e., of its creation or population of the data records). To avoid obscuring the description of the process 600 with unnecessary detail, FIG. 6 illustrates that the process 600 supplies confirmations for all non-Physical_Port table tuples at once after receiving all of these data tuples. One of ordinary skill will realize that in some embodiments the process 600 supplies a confirmation for each set of such tuples (e.g., for each set of tuples for a table) after processing that set of tuples.

Once the process 600 has provided (at 610) confirmation of processing of all the received data tuples, the process receives (at 615) the VLAN-binding tuple(s) for the logical switch. The process 600 then records the received VLAN-binding tuple(s) in the vlan_bindings column of the Physical_Port table. As populated, each VLAN binding tuple in the vlan_bindings column of the Physical_Port table binds a specific VLAN on a specific physical port of the hardware switch to the logical switch. In some embodiments, the process 600 receives only one VLAN-binding tuple for each logical switch for the hardware switch, because in these embodiments each logical switch can bind to at most one VLAN binding of a physical port. In other embodiments, however, the process can receive more than one VLAN-binding tuple for each logical switch for the hardware switch, because in these embodiments each logical switch can bind to more than one VLAN binding of a physical port or to more than one port.

After storing (at 615) the received VLAN-binding tuple(s) in the Physical_Port table, the process 600 creates (at 620) a lock for the logical switch. In the embodiments that do not utilize a lock for modifying a logical switch's configuration on a hardware switch, no lock is defined at 620. On the other hand, in the embodiments in which the controller needs a lock to modify the logical switch's records, the controller can steal the logical switch's lock, in order to prevent the hardware switch's OVSdb client from modifying the data plane records based on control plane records that the controller has not been able to fully update. In some embodiments, the process 600 creates a lock for the logical switch at the request of the process 500 of the network controller. Specifically, in these embodiments, the configuration data provided by the network controller includes a request to create a lock for the logical switch. In other embodiments, the process 600 of the OVSdb server is pre-configured to create locks for logical switches, and hence does not need to be directed to do this by the network controller.

Next, at 625, the process 600 sends a confirmation to the TOR agent that it has processed the VLAN-binding tuple(s), and created the logical switch. In some embodiments, the process 600 also provides (at 625) a logical switch name and/or this switch's lock name or attribute to the process 500 so that the network controller (e.g., the TOR agent) will have a handle for requesting the lock for a subsequent logical switch update. In other embodiments, the process 600 does not provide to the process 500 the logical switch's name/attribute as the controller operates on an assumption that the logical switch has a lock.

After providing (at 625) the confirmation to the process 500, the process 600 notifies (at 630) the TOR's OVSdb client 452 of the creation of records in the OVS database 438 for the new logical switch. At this point, the OVSdb client 452 begins to access the OVS database 438 through the OVSdb server 420, in order to update the TOR's forwarding plane records (e.g., forwarding tables 450). After 630, the process ends.

As described above, the MHFEs in some embodiments contain configuration databases and execute database servers with which the network controllers can interact through a database protocol. The database protocol of some embodiments provides a lock operation to lock or unlock an LFE's records in an MHFE's configuration database. The lock operation allows the network controller to steal the lock in order to prevent an MHFE database client from obtaining the lock and reading the LFE's records in the configuration database, while the controller writes to the configuration database. The lock feature resolves conflicts by making the MHFE agent receive the lock, and hence receive permission, before it can read the LFE's records in the database.

More specifically, in some embodiments, a controller must obtain a lock for an LFE from the MHFE's database server before the controller can modify the LFE's records in the database. In some embodiments, the controller obtains the lock through a steal request in order (1) to be able to get the lock irrespective of whether the MHFE database client currently has the lock and (2) to be able to block the MHFE database client from getting back the lock. Similarly, an MHFE database client must obtain a lock for an LFE from the MHFE's database server before this client can read the LFE's records in the database. When the controller has stolen the lock, the WIFE database client cannot obtain the lock through a lock request until the controller releases the lock. After receiving a lock release from the controller, the database server provides the lock to the MHFE agent so that it can then read the LFE's records in the database.

Figure 7:
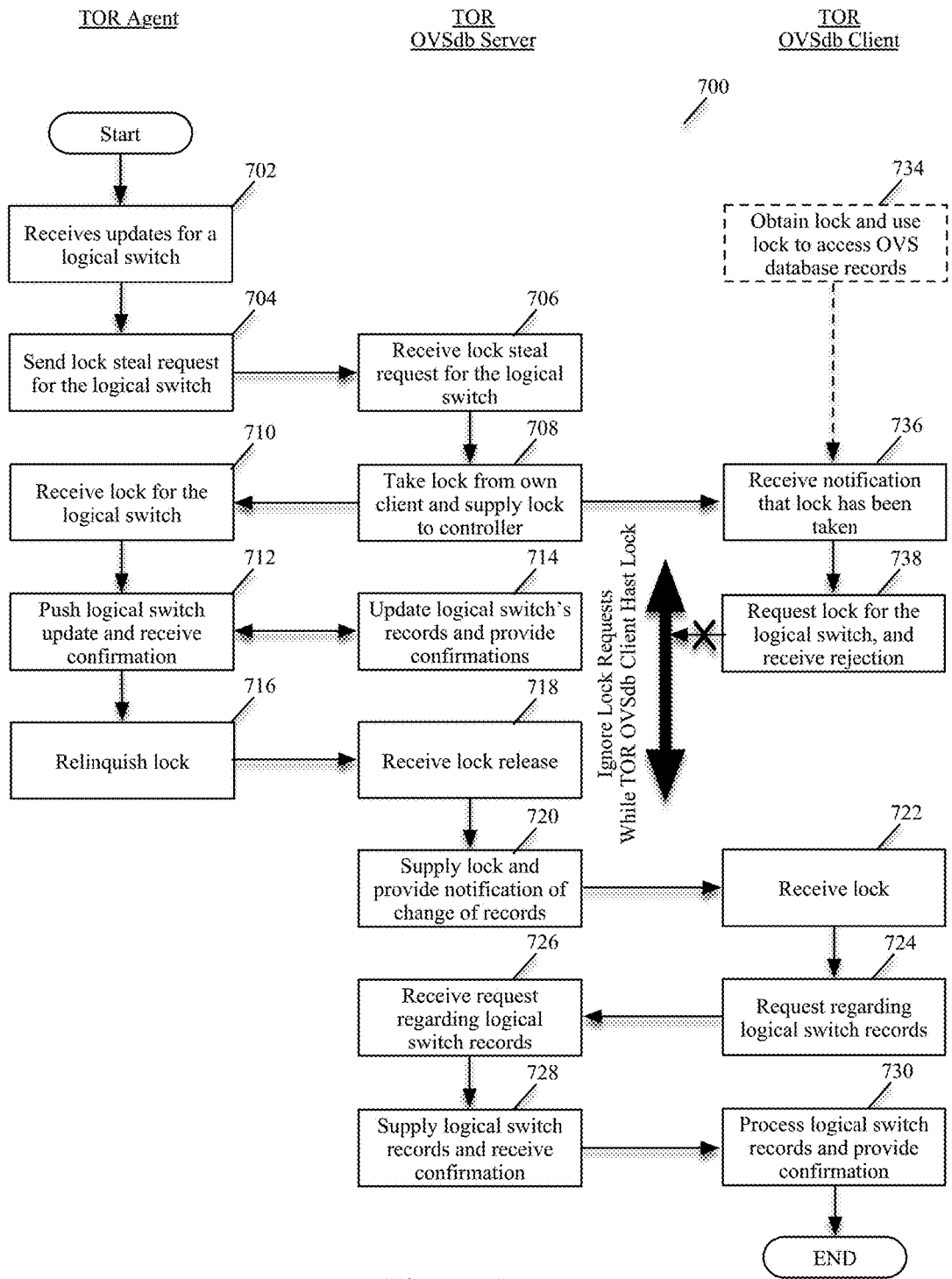
FIG. 7 conceptually illustrate the processes that the TOR agent, OVSdb server and the OVSdb client perform in some embodiments during and after a period in which the TOR agent modifies the records of a logical switch in the OVS database.

FIG. 7 illustrate a process 700 that the TOR agent, OVSdb server 420 and the OVSdb client 452 perform in some embodiments during and after a period in which the TOR agent modifies the records of a logical switch in the OVS database 438. As shown, the process 700 starts when the TOR agent receives (at 702) updates to one or more of the logical switch's data tuples from the logical controller 335 for the logical switch.

Next, at 704, the OVSdb client 460 of the TOR agent 340 provides a lock steal request for the logical switch to the OVSdb server 420 of the TOR. In some embodiments, the OVSdb client 460 first provides a lock request to the OVSdb server 420, and if it is told that the lock currently resides with the TOR's OVSdb client 452, then provides a lock steal request to the OVSdb server 420. In other embodiments, however, the OVSdb client 460 just provides a lock steal request without first providing a lock request and having this lock request rejected, as illustrated in FIG. 7.

After receiving (at 706) this request, the OVSdb server 420 sends (at 708) a notification to the TOR's OVSdb client 452 that it has lost the lock. As shown, prior to receiving this notification (at 736), the TOR's OVSdb client 452 in this example had obtained the lock (at 734) so that it could access the OVS database 438.

After notifying the OVSdb client 452 that it no longer has the lock for the logical switch, the OVSdb server 420 provides (at 708) this lock to the TOR agent's OVSdb client 460. Upon receiving (at 710) the lock for the logical switch, the OVSdb client 460 sends (at 712) one or more logical-switch update data tuples to the OVSdb server 420. Based on the update data tuples, the OVSdb server 420 modifies (at 714) one or more logical switch's records in the OVS database 438.

Once the OVSdb server 420 has received and processed all update data tuples from the TOR agent's OVSdb client 460, the OVSdb server 420 provides (at 714) a confirmation to the OVSdb client 460 that it has processed all of the update data tuples. After receiving (at 712) this confirmation, the TOR agent's OVSdb client 460 sends (at 716) a lock release command to the OVSdb server 420 so that it can relinquish the logical switch's lock. At 718, the OVSdb server 420 receives the lock release.

During the period in which the TOR agent's OVSdb client 460 has acquired the lock for the logical switch, the TOR's OVSdb server 420 does not respond to any lock request from the TOR's OVSdb client 452 for the logical switch. FIG. 7 pictorially illustrates a lock request 738 by the OVSdb client 452. As shown, the OVSdb server 420 does not respond to this lock request while the TOR agent has acquired the lock for the logical switch. In some embodiments, the OVSdb server 420 affirmatively rejects a lock request from the OVSdb client 452 while the TOR agent has acquired the logical switch's lock, instead of just not responding to such a request.

After the OVSdb server receives (at 718) the lock release from the TOR agent, the OVSdb server supplies (at 720) a notification to the TOR's OVSdb client 452 of the changes to the logical switch's records in the OVS database 438. At 720, the OVSdb server also provides the lock for the logical switch to the TOR's OVSdb client 752. The OVSdb client 752 receives (at 722) the lock release and change notification, and in response, directs (at 724) the OVSdb server to supply the updated logical switch records to it.

While the example illustrated in FIG. 7 shows the OVSdb server 420 providing both the lock and change notification at 720, the OVSdb server 420 of some embodiments only provides the lock at 720. In these embodiments, when the OVSdb client 452 automatically checks for changes to the logical switch records when it obtains the lock. Also, in some embodiments, the OVSdb server 420 just provides the change notification at 720. In response to this notification, the OVSdb client 452 then asks the OVSdb server for the lock before asking the OVSdb server for the logical switch's records.

In the example illustrated in FIG. 7, the OVSdb server receives (at 726) the request for the logical switch's records, and provides (at 728) the updated logical switch records to the TOR's OVSdb client 752. At 730, the OVSdb client then modifies the forwarding plane records (e.g., the records in the forwarding tables 450) based on the received logical switch records. In some embodiments, the TOR's OVSdb client 752 provides a confirmation of recording these updates to the OVSdb server. In other embodiments, the client does not provide such a confirmation.

After updating the forwarding plane records, the OVSdb client relinquishes the lock and the process 700 then ends. In some embodiments, the OVSdb client does not relinquish the lock for the logical switch even after updating the forwarding plane records for the logical switch based on a control plane update for the logical switch. In these embodiments, the OVSdb server affirmatively takes away the lock from the TOR's OVSdb client 452 once the TOR agent's OVSdb client 460 wants to modify the logical switch's control plane records.

FIG. 7 illustrates the OVSdb server 420 as sending (at 720) one update notification to the TOR's OVSdb client 452 once the TOR agent has completed its control plane update for the logical switch. In other embodiments, the OVSdb server 420 or some other notification process associated with the OVS database 438 notifies the TOR's OVSdb client 452 with multiple update notifications while the TOR agent is updating multiple data tuple sets associated with the logical switch. In these embodiments, the TOR's OVSdb client 452 repeatedly attempts to obtain the logical switch's lock in response to the various different notifications, but these attempts are unsuccessful while the TOR agent's OVSdb client 460 has not released the lock.

In some embodiments, the OVSdb server 420 provides a logical switch's lock to the TOR agent's OVSdb client 460 anytime that this client asks for the lock. Other embodiments, however, place some restriction on the TOR agent's OVSdb client 460 obtaining the switch's lock. For instance, after the OVSdb client 460 has supplied one set of updates to the logical switch's control plane records and has relinquished the logical switch's lock, the OVSdb server 420 does not allow this client 460 to reacquire the logical switch's lock while the TOR OVSdb client 452 is updating the TOR's forwarding plane records in view of the supplied control plane updates. In these embodiments, the OVSdb server 420 only allows the TOR agent's OVSdb client 460 to reacquire the logical switch's lock after receiving a confirmation from the TOR's OVSdb client 452 that it has processed all of the updates supplied by the TOR agent.

Figure 8:
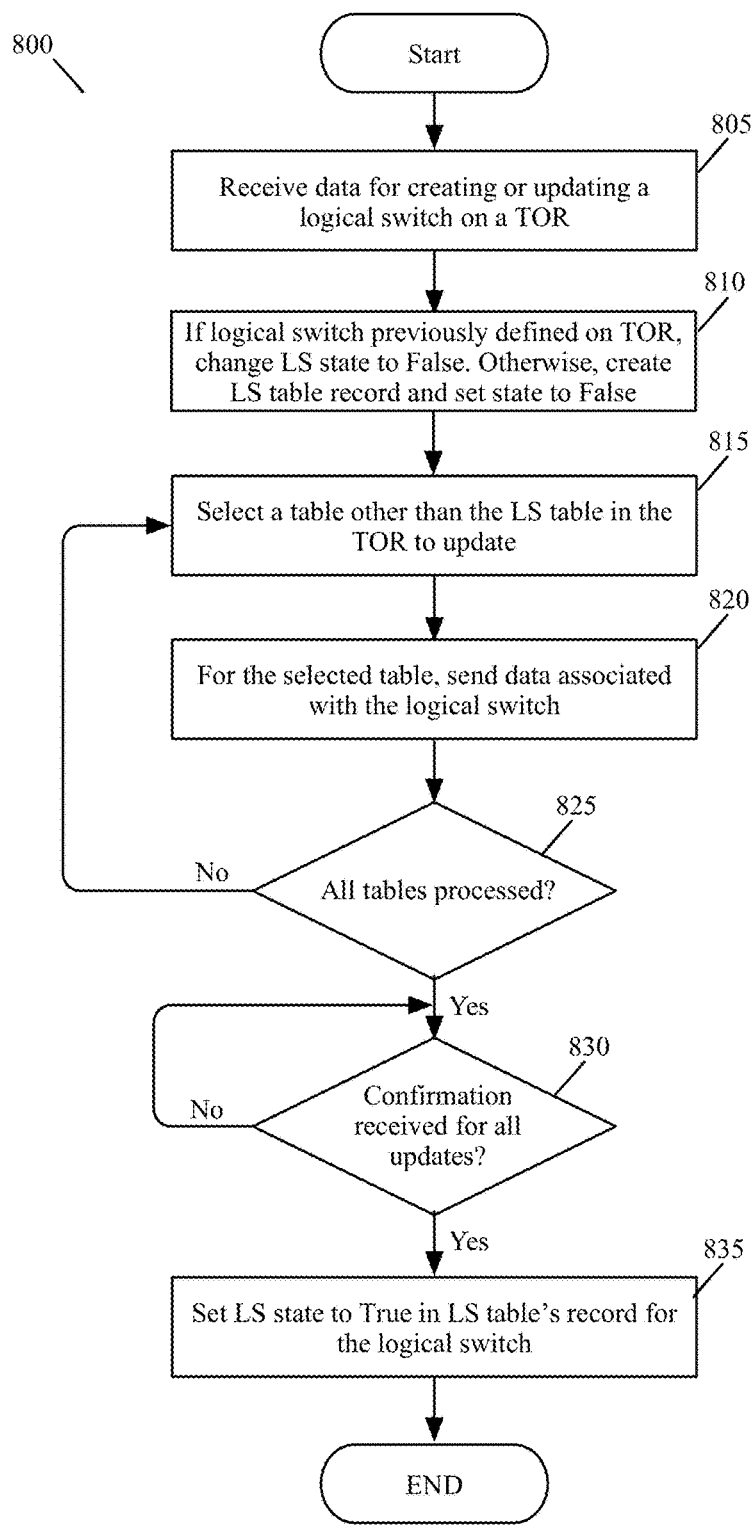
FIG. 8 conceptually illustrates a process that a TOR agent performs in some embodiments to supply define a logical switch or modify a logical switch definition in a transactional manner for a TOR.

FIG. 8 illustrates a process 800 that a TOR agent performs in some embodiments to define a logical switch or to modify a logical switch definition in a transactional manner for a TOR by using a state_consistent tuple 205 for the logical switch. As shown, this process initially (at 805) receives the definition of a logical switch that needs to be deployed on a TOR, or receives a modification to the definition of a previously defined logical switch that has already been deployed on the TOR. When the logical switch is a new logical switch that is being deployed on the TOR, the process sends (at 810) one or more packets to the TOR's OVSdb server 420 to create a record for this logical switch in the logical switch table 200, and to set the state_consistent value in this record for the logical switch to False.

On the other hand, when the logical switch was previously deployed on the TOR, the process sends (at 810) one or more packets to the TOR's OVSdb server 420 to direct it to change the state_consistent value of the logical switch to False in the logical switch table 200. Changing this state to False prevents the TOR's OVSdb client 452 from accessing the OVS database records for this logical switch. In some embodiments, when this state is False, the TOR's OVSdb server 420 ignores or rejects the TOR's OVSdb client's 452 requests for access to the records in the OVS database 438 that relate to the logical switch.

At 815, the process 800 selects a table to update in the TOR's OVS database other than the Logical_Switch table. Examples of such tables include the Ucast_Macs_Remote table, the Mcast_Macs_Remote table and the Physical_Port table. At 820, the process sends to the TOR's OVSdb server 420 one or more packets that contain data for defining one or more records in the selected table (i.e., the table selected at 815) for the logical switch. Examples of such records include the logical switch record in the VLAN bindings for the Physical_Port table 120, MAC records in the Ucast table 105, and service node records in the Mcast table 110, as described above by reference to FIG. 1.

Next, at 825, the process 800 determines whether it has pushed to the TOR's OVSdb server 420 the data for all the OVS database tables other than the Logical_Switch table. If not, the process 800 returns to 815 to select another OVSdb table other than the Logical_Switch table, and then to 820 to push data records for this newly selected table to the TOR's OVSdb server 420. For some embodiments, the illustration of the determination operation 820 is conceptual as in these embodiments the TOR agent selects the OVSdb tables according to a fixed order, in which the Logical_Switch table is last.

Once the process 800 determines (at 825) that it has processed all the OVSdb tables other than the Logical_Switch table, the process 800 determines (at 830) whether it has received confirmation from the TOR's OVSdb server 420 that it has created and/or populated the appropriate records in the OVS database 438. If so, the process 800 transitions to 835. If not, the process 800 remains at 830 until it has received the required confirmations. In some cases, the process 800 resends data for an OVSdb table when it does not receive the required confirmation for this table. Also, in some cases, the process 800 does not wait for confirmation from the OVSdb server 420 that it has processed the previously supplied data tuples. In these embodiments, the process 800 simply transitions from 825 to 835 when it determines that it has processed all the OVSdb tables other than the Logical_Switch table.

At 835, the process directs (at 835) the TOR's OVSdb server 420 to change the state_consistent tuple in the Logical_Switch table 200 to True. When the logical switch's record in this table has to be modified, the process 800 in some embodiments also sends (at 835) other data tuples to change other parameters in the Logical_Switch table for the logical switch. In some embodiments, the process 800 sends such other data tuple(s) before changing the state_consistent tuple to True. In other embodiments, the process 800 sends the other logical_switch tuple(s) for changing a pre-existing logical switch's record in the table 200 at 810, instead of 835.

The process 800 remains at 835 until it receives confirmation from the TOR that it has changed the state_consistent tuple to True for the logical switch. Once the process receives this confirmation, it ends. The process 800 changes the state_consistent tuple to True last in order to prevent the OVSdb client 452 from updating the forwarding tables 450 until all of the logical switch's records have been specified/modified in the OVS database 438. In some embodiments, the OVSdb server 420 does not notify the OVSdb client 452 of changes to the OVS database 438 relating to a logical switch until the state_consistent tuple is changed from False to True. In other embodiments, the OVSdb client 452 receives notifications of changes to the OVS database 438 relating to a logical switch even when the state_consistent tuple is False. However, while this value is False, the OVSdb server 420 ignores or rejects all requests by the OVSdb client 452 for access to records in the OVS database 438 relating to the logical switch. In either of these approaches, by delaying pushing the state_consistent tuple, the process 800 can prevent the OVSdb client 452 from updating the forwarding plane until the process has pushed all the control plane records or modifications for the logical switch to the TOR.

Figure 9:
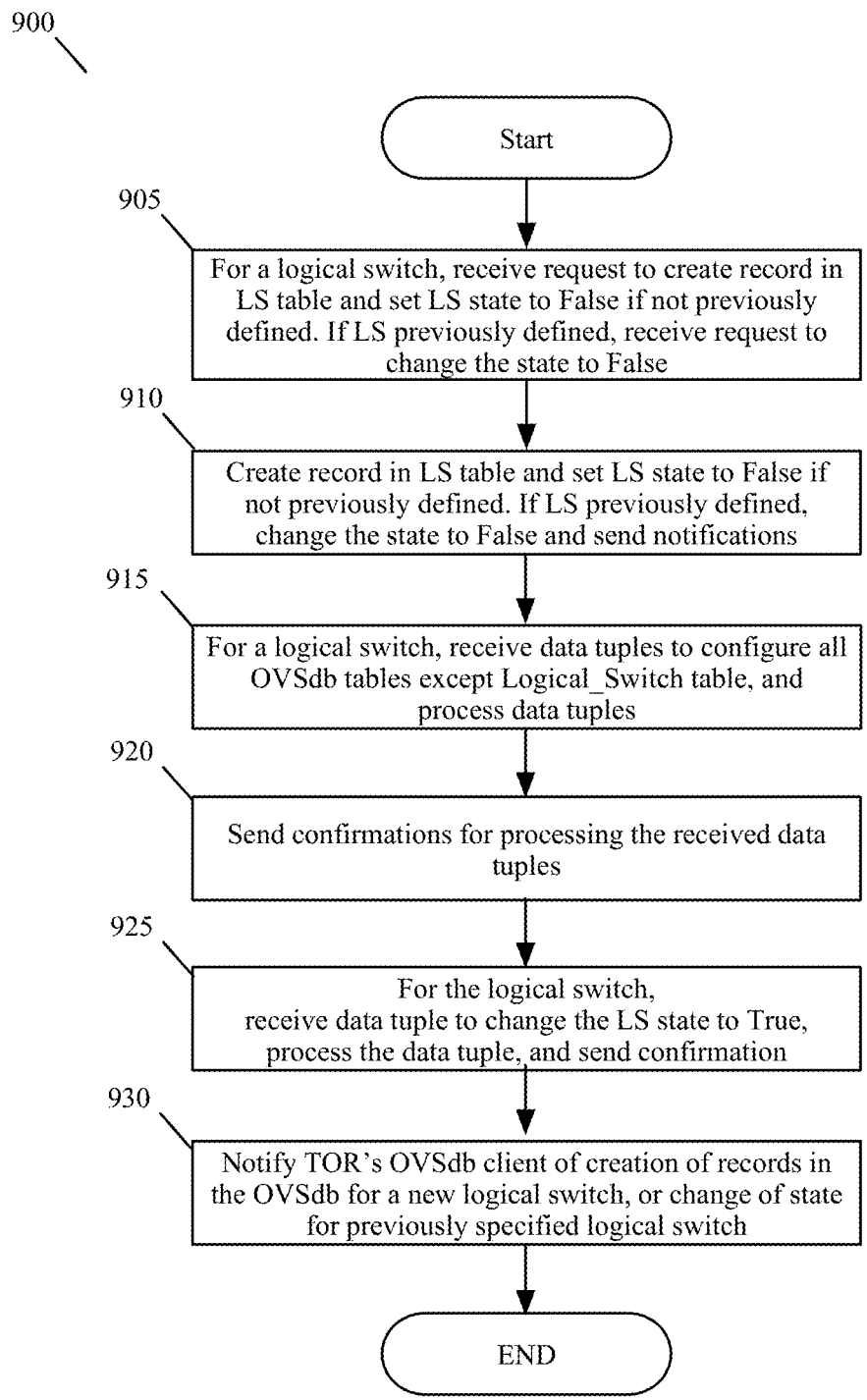
FIG. 9 conceptually illustrates a process that a hardware switch's OVSdb server performs to create a logical switch on the hardware switch, or to update the configuration of a previously created logical switch on the hardware switch.

FIG. 9 illustrates a process 900 that a hardware switch's OVSdb server 420 performs to create a logical switch on the hardware switch, or to update the configuration of a previously created logical switch on the hardware switch. This process starts when it OVSdb server 420 receives (at 905) from the network controller data tuples for the logical switch to the OVSdb server 420. When the logical switch was previously created, the process 900 initially receives (at 905) a request from the process 800 to change the logical switch's state_consistent tuple to False. In response, the process 900 (at 910) changes this tuple to False in the Logical_Switch table 200, sends a notification to the hardware switch's OVSdb client 452 of this changed state, and then sends a confirmation of this change to the process 800 (i.e., to the TOR agent of the network controller).

On the other hand, when the logical switch was not previously created, the process 900 receives (at 905) one or more data tuples to create a record for this logical switch in in the logical switch table 200, and to set the state_consistent value in this record for the logical switch to False. In response, the process 900 (at 910) creates a record in the Logical_Switch Table 200 for the logical switch, sets the state_consistent tuple in this record to False, and then sends a confirmation of the creation of the record to the process 800 (i.e., to the TOR agent of the network controller).

At 915, the process 900 receive data tuples from the process 800 of the network controller (e.g., TOR agent) for the logical switch. These data tuples include tuples for the OVSdb tables that need to have records for the logical switch to be defined on the hardware switch. These tables include the Ucast_Macs_Remote table 105, the Mcast_Macs_Remote table 110 and the Physical_Port table 120. These data tuples (received at 915) do not include data tuples for the Logical_Switch table 115.

At 915, the process creates the records and/or populates previously created records in these tables based on the received data tuples. At 920, the process then sends confirmation to the process 800 of the network controller of its processing of the received data tuples (i.e., of its creation or population of the data records in the non Logical_Switch tables of the OVS database 438 for the logical switch). To avoid obscuring the description of the process 900 with unnecessary detail, FIG. 9 illustrates that the process 900 supplies a confirmation for all non-Logical_Switch table tuples at once after receiving all of these data tuples. One of ordinary skill will realize that in some embodiments the process 900 supplies a confirmation for each set of such tuples (e.g., for each set of tuples for a table) after processing that set of tuples.

Once the process 900 has provided confirmation of processing of all the received data tuples, the process (at 925) receives a data tuple to change the state_consistent tuple to True and change this state to True. When the logical switch's record in this table has to be modified, the process 900 in some embodiments also receives (at 925) other data tuples to change other parameters in the Logical_Switch table for the logical switch. In some embodiments, the process 900 receives such other data tuple(s) and processes these data tuples (e.g., changes records in the database tables based on these tuples) before changing the state_consistent tuple back to True. In other embodiments, the process 900 receives the other logical switch tuple(s) for changing a pre-existing logical switch's record in the table 200 at 905 instead of 925, and it changes the Logical_Switch table 200 tuple(s) at 910 instead of 925.

After storing (at 915) the received data tuple(s) in the Logical_Switch table, the process 900 sends (at 920) a confirmation to the process 800 that it has processed the tuple(s) Logical_Switch table. When the logical switch was not previously created, this confirmation also informs the process 800 of the creation of the logical switch. In some embodiments, the process 900 also provides (at 920) a logical switch name to the process 800 so that the network controller (e.g., the TOR agent) will have a handle for the logical switch. In other embodiments, the process 900 does not provide the logical switch's name to the process 800 as the controller has this switch's identifier.

Once the process 900 has made its change(s) to the Logical_Switch table 200 at 925, the process sends a confirmation of its processing the data tuple(s) received at 925. After providing (at 925) the confirmation to the process 800, the process 900 notifies (at 930) the TOR's OVSdb client 452 of the creation of records in the OVSdb database 438 for the new logical switch or of the change of state_consistent tuple to True for a previously created logical switch. At this point, the OVSdb client 452 can begin to access the OVS database 438 through the OVSdb server 420, in order to update the TOR's forwarding plane records (e.g., forwarding tables 450). After 925, the process ends.

One of ordinary skill will realize that the approach illustrated in FIGS. 8 and 9 is just one way of using the state_consistent tuple to create/update a logical switch's records on a TOR. Other embodiments use this data tuple differently. For instances, some embodiments do not first create the logical switch's record in the Logical_Switch table and define the state_consistent tuple in this record to False, when the logical switch is being initially defined on a TOR. These embodiments just create the logical switch's record in the Logical_Switch table last. In some of these embodiments, the hardware VTEP schema is modified to allow the other tables (e.g., Ucast table 105 and Mcast table 110) to be created before the logical switch's record is created in the Logical_Switch table 200.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
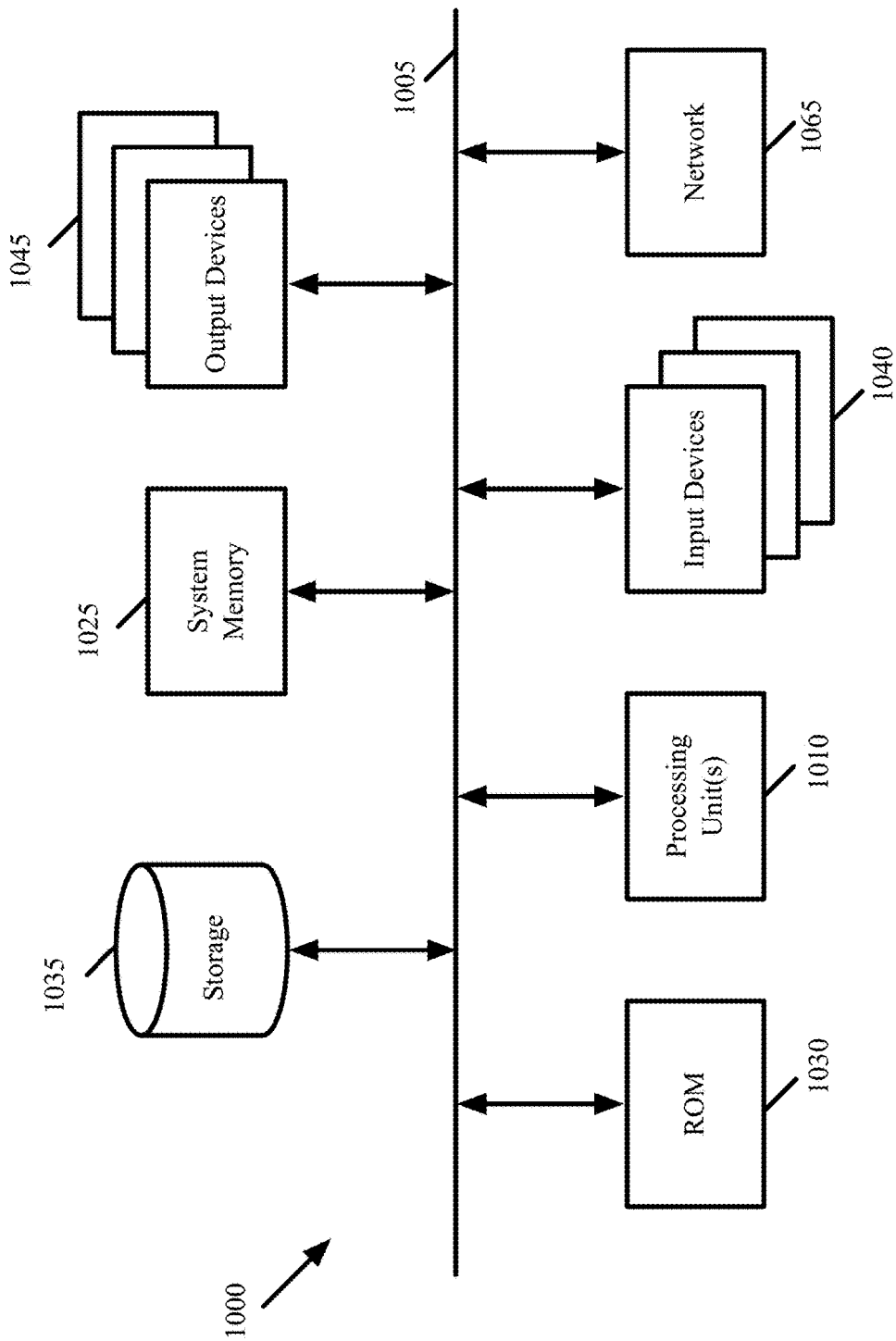
FIG. 10 conceptually illustrates a computer system that implements processes of some embodiments of the invention.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 5-9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

The invention claimed is:

1. A non-transitory machine readable medium storing a program for configuring a managed hardware forwarding element (MHFE) that implements a logical forwarding element (LFE), wherein a set of software forwarding elements executing on host computers also implement the LFE, the program comprising sets of instructions for:
   creating a lock for the LFE on the MHFE once the LFE is defined on the MHFE, the lock relating to a data tuple set received from a controller to define the LFE on the MHFE;
   allowing an MHFE module access to the LFE data tuple set for the MHFE module to use to configure data plane forwarding records of the MHFE used by a forwarding engine of the MHFE to process data messages;
   in response to a lock steal request from the controller that requires the lock to be provided to the controller even when the MHFE module has obtained the lock, providing the lock to the controller to enable the controller to write to a data store on the MHFE that stores the data tuple set;
   in response to a lock request from the MHFE module, providing the lock to the MHFE module unless the lock is currently with the controller, wherein while the controller has the lock, the controller is the master of the LFE data tuple set on the MHFE, preventing the MHFE module from reading the LFE data tuple set.

2. The non-transitory machine readable medium of claim 1, wherein the program further comprises sets of instructions for:
   receiving a lock request from the MHFE module while the lock has been provided to the controller in response to the lock steal request; and
   ignoring the lock request from the MHFE module until the controller releases the lock.

3. The non-transitory machine readable medium of claim 2, wherein the program further comprises sets of instructions for:
   receiving a lock release from the controller; and
   providing the lock to the MHFE module in response to the lock release.

4. The non-transitory machine readable medium of claim 1, wherein the program further comprises sets of instructions for:
   receiving a lock request from the MHFE module while the lock has been provided to the controller in response to the lock steal request; and
   sending a lock request rejection to the MHFE module as the controller has not yet released the lock.

5. The non-transitory machine readable medium of claim 4, wherein the program further comprises sets of instructions for:
   receiving a lock release from the controller;
   receiving a lock request from the MHFE module after the controller releases the lock; and
   providing the lock to the MHFE module in response to the lock request that is received after the controller releases the lock.

6. The non-transitory machine readable medium of claim 1, wherein the program further comprises sets of instructions for:
   before creating the lock, receiving the data tuple set from the controller; and
   storing the data tuple set to define the LFE on the MHFE.

7. The non-transitory machine readable medium of claim 1, wherein the program further comprises a set of instructions for, in response to a lock request from the MHFE module while the controller has the lock, not providing the lock to the MHFE module in order to prevent the MHFE module from accessing the LFE data tuple set while the controller is writing to the data tuple set, so that the MHFE module cannot update the data plane forwarding records until the controller finishes writing to the LFE data tuple set and returns the lock.

8. The non-transitory machine readable medium of claim 1, wherein the program further comprises sets of instructions for:
   receiving a lock release from the controller;
   in response to a lock request from the MHFE module after the controller has released the lock, providing the lock to the MHFE module in order to allow the MHFE module to access the LFE data tuple set so that the MHFE module can update the data plane forwarding records based on changes to the LFE data tuple set that were made by the controller while the controller had the lock.

9. The non-transitory machine readable medium of claim 1, wherein the program further comprises a set of instructions for notifying the controller and the MHFE module of the creation of the lock for the LFE.

10. The non-transitory machine readable medium of claim 1, wherein:
    the LFE data tuple set comprises records in a database stored on the MHFE;
    the database records are managed by a database server on the MHFE; and
    the controller and MHFE module each have a database client for accessing the LFE database records through the database server.

11. The non-transitory machine readable medium of claim 10, wherein the database uses a hardware VTEP schema and the controller's database client communicates with the database server through a database communication protocol.

12. A method for configuring a managed hardware forwarding element (MHFE) that implements a logical forwarding element (LFE), wherein a set of software forwarding elements executing on host computers also implement the LFE, the method comprising:

creating a lock for the LFE on the MHFE once the LFE is defined on the MHFE the lock relating to a data tuple set received from a controller to define the LFE on the MHFE;

allowing an MHFE module access to the LFE data tuple set for the MHFE module to use to configure data plane forwarding records of the MHFE used by a forwarding engine of the MHFE to process data messages;

in response to a lock steal request from the controller that requires the lock to be provided to the controller even when the MHFE module has obtained the lock, providing the lock to the controller to enable the controller to write to a data store on the MHFE that stores the data tuple set;

in response to a lock request from the MHFE module, providing the lock to the MHFE module unless the lock is currently with the controller, wherein while the controller has the lock, the controller is the master of the LFE data tuple set on the MHFE, preventing the MHFE module from reading the LFE data tuple set.

13. The method of claim 12 further comprising:
receiving a lock request from the MHFE module while the lock has been provided to the controller in response to the lock steal request; and
ignoring the lock request from the MHFE module until the controller releases the lock.

14. The method of claim 13 further comprising:
receiving a lock release from the controller; and
providing the lock to the MHFE module in response to the lock release.

15. The method of claim 12 further comprising:
receiving a lock request from the MHFE module while the lock has been provided to the controller in response to the lock steal request; and
sending a lock request rejection to the MHFE module as the controller has not yet released the lock.

16. The method of claim 15 further comprising:
receiving a lock release from the controller;
receiving a lock request from the MHFE module after the controller releases the lock; and
providing the lock to the MHFE module in response to the lock request that is received after the controller releases the lock.

17. The method of claim 12 further comprising, before creating the lock:
receiving the data tuple set from the controller; and
storing the data tuple set in a database on the MHFE.

18. The method of claim 12, wherein the LFE data tuple set is stored as database records in a database on the MHFE that are managed by a database server on the MHFE.

19. The method of claim 18, wherein the controller has a first database client for accessing the database records through the database server and the MHFE module has a second database client for accessing the database records through the database server.

20. The method of claim 19, wherein the database uses a hardware VTEP schema and the first database client communicates with the database server through a database communication protocol.

* * * * *